(12) United States Patent
Kirker et al.

(10) Patent No.: US 6,706,180 B2
(45) Date of Patent: Mar. 16, 2004

(54) SYSTEM FOR VIBRATION IN A CENTRIFUGE

(75) Inventors: Curtis Kirker, Kamuela, HI (US); Berkeley F. Fuller, Kamuela, HI (US)

(73) Assignee: Phase Inc., Kamuela, HI (US)

( * ) Notice: Subject to any disclaimer, the term of this patent is extended or adjusted under 35 U.S.C. 154(b) by 0 days.

(21) Appl. No.: 10/294,840

(22) Filed: Nov. 14, 2002

(65) Prior Publication Data

US 2003/0070983 A1 Apr. 17, 2003

Related U.S. Application Data

(63) Continuation-in-part of application No. 10/217,734, filed on Aug. 13, 2002
(60) Provisional application No. 60/312,324, filed on Aug. 13, 2001, and provisional application No. 60/332,238, filed on Nov. 15, 2001.

(51) Int. Cl.[7] .................. B01D 17/038; B01D 21/26; B04B 1/04; B04B 1/12; B04B 7/12
(52) U.S. Cl. ............. 210/232; 210/360.1; 210/377; 210/380.1; 210/388; 210/781; 210/785; 494/36; 494/37; 494/44; 494/47; 494/55; 494/60; 494/82
(58) Field of Search ................ 210/232, 360.1, 210/377, 380.1, 388, 781, 785; 494/36, 37, 44, 47, 56, 60, 82

(56) References Cited

U.S. PATENT DOCUMENTS

| | | |
|---|---|---|
| 2,028,168 A | 1/1936 | Roberts |
| 2,538,529 A | 1/1951 | Komline ............... 233/20 |
| 2,688,437 A | 9/1954 | Monnet |
| 3,327,401 A | 6/1967 | Stamos et al. |

(List continued on next page.)

FOREIGN PATENT DOCUMENTS

| | | | |
|---|---|---|---|
| DE | 1632324 | 10/1970 | ......... B04B/3/20 |
| EP | 0346056 | 12/1989 | ......... B04B/1/08 |
| FR | 870540 | 3/1942 | ............... 14/6 |
| FR | 1.038.726 | 10/1953 | |
| JP | 2001-113204 | 10/1999 | |
| JP | 2001113204 A * | 4/2001 | ......... B04B/1/02 |
| WO | 00/02663 | 1/2000 | ......... B04B/1/00 |
| WO | 02/42004 A1 | 5/2002 | ......... B04B/15/06 |

OTHER PUBLICATIONS

English Abstract from the Patent Abstracts of Japan along with a Machine Translation of the rest of the specification of Japanese Patent Publication No. JP 2001113204 A. JP 2001113204 A was published on Apr. 2001.*
International Search Report PCT/US 02/13186, Sep. 10, 2002.
International Search Report PCT/US99/15891, 6 pages, Jul. 12, 1999.
International Search Report PCT/US 02/36830, 8 pages, Mar. 12, 2003.

*Primary Examiner*—David A. Reifsnyder
(74) *Attorney, Agent, or Firm*—Baker Botts L.L.P.

(57) ABSTRACT

A system and method for vibration in a centrifuge is disclosed. A centrifuge for removing more dense material from a fluid medium includes a fluid separation wall placed within a non-rotating sleeve. The fluid separation wall rotates around the axis of rotation and includes an inner surface and an outer surface with at least one receptacle formed on the inner surface of the fluid separation wall. The receptacle aids in separation of more dense material from the fluid medium by forming a void space between the inner and outer surface. An excitation apparatus associated with the receptacle to create a vibration within the receptacle. A flow path may extend through the wall from the void area to the outer surface to transport more dense material to the containment zone.

28 Claims, 8 Drawing Sheets

U.S. PATENT DOCUMENTS

| | | |
|---|---|---|
| 3,937,317 A | 2/1976 | Fleury, Jr. |
| 3,960,318 A | 6/1976 | Dahlberg |
| 3,967,778 A | 7/1976 | Hunwick |
| 3,977,515 A | 8/1976 | Lewoczko |
| 4,005,817 A | 2/1977 | Charlton |
| 4,015,773 A | 4/1977 | Thylefors |
| 4,067,494 A | 1/1978 | Willus |
| 4,070,290 A | 1/1978 | Crosby |
| 4,103,822 A | 8/1978 | Stroucken |
| 4,251,023 A | 2/1981 | Hohne |
| 4,298,162 A | 11/1981 | Hohne |
| 4,311,270 A | 1/1982 | Hovstadius |
| 4,331,270 A | 5/1982 | Humlong |
| 4,343,431 A | 8/1982 | Wehling |
| 4,375,870 A | 3/1983 | Bodelson .................... 494/40 |
| 4,379,976 A | 4/1983 | Pitchford ................... 310/83 |
| 4,381,849 A | 5/1983 | Connut ........................ 494/43 |
| 4,430,221 A | 2/1984 | Spiewok ................ 210/380.1 |
| 4,504,262 A | 3/1985 | Forsberg .................... 494/53 |
| 4,505,697 A | 3/1985 | Lee et al. ................... 494/35 |
| 4,519,496 A | 5/1985 | Ludvegsen ................ 198/676 |
| 4,569,761 A | 2/1986 | Spiewok et al. ......... 210/380.1 |
| 4,581,896 A | 4/1986 | Andeson ..................... 60/487 |
| 4,629,564 A | 12/1986 | Pinato |
| 4,643,709 A | 2/1987 | Lee et al. ................... 494/37 |
| 4,698,053 A | 10/1987 | Stroucken .................. 494/70 |
| 4,701,158 A | 10/1987 | Inge et al. .................. 494/74 |
| 4,710,159 A | 12/1987 | Gullers ....................... 494/27 |
| 4,721,505 A | 1/1988 | Inge et al. .................. 494/74 |
| 4,729,759 A | 3/1988 | Krook .......................... 494/4 |
| 4,784,634 A | 11/1988 | Schiele ....................... 494/56 |
| 4,813,923 A | 3/1989 | Johansson ................... 494/48 |
| 4,820,256 A | 4/1989 | Nordstrom .................... 494/3 |
| 4,840,612 A | 6/1989 | Pallmar ........................ 494/1 |
| 4,861,329 A | 8/1989 | Borgstrom et al. .......... 494/67 |
| 4,978,331 A | 12/1990 | Luchetta ..................... 494/37 |
| 5,045,049 A | 9/1991 | Lantz .......................... 494/70 |
| 5,052,996 A | 10/1991 | Lantz .......................... 494/68 |
| 5,197,939 A | 3/1993 | Cederkvist .................. 494/53 |
| 5,202,024 A | 4/1993 | Andersson et al. |
| 5,244,584 A | 9/1993 | Schlieperskoetter ........ 210/787 |
| 5,362,292 A | 11/1994 | Borgstrom et al. .......... 494/74 |
| 5,374,234 A | 12/1994 | Madsen ....................... 494/53 |
| 5,380,434 A | 1/1995 | Paschedag |
| 5,397,471 A | 3/1995 | Rodebush |
| 5,429,581 A | 7/1995 | Michaud ...................... 494/54 |
| 5,601,522 A | 2/1997 | Piramoon ................... 156/172 |
| 5,759,744 A | 6/1998 | Brueck et al. .............. 430/312 |
| 6,033,564 A | 3/2000 | Kirker et al. ............... 210/232 |
| 6,149,572 A | 11/2000 | Knelson ...................... 494/37 |
| 6,248,053 B1 * | 6/2001 | Ehnstrom et al. ............. 494/56 |
| 6,312,610 B1 | 11/2001 | Kirker et al. ............... 210/781 |
| 6,322,698 B1 | 11/2001 | Rios et al. ............. 210/321.75 |

* cited by examiner

SYSTEM FOR VIBRATION IN A CENTRIFUGE

CROSS REFERENCE TO RELATED APPLICATION

This application is a continuation-in-part of U.S. patent application Ser. No. 10/217,734, entitled "Receptacle Wall Vibration in a Centrifuge Device to Enable Additional or Enhanced Separation and/or De-watering," filed by Curtis Kirker et al. on Aug. 13, 2002, now allowed that claims the benefit of U.S. Provisional Application Ser. No. 60/312,324 filed Aug. 13, 2001.

This continuation-in-part application also claims the benefit of U.S. Provisional Application Serial No. 60/332,238, entitled "Apparatus for Enhanced Separating and De-watering in a Centrifugal Separator which Combines Centrifugal Force, Compression Using Wall Shapes and Vibration," filed by Curtis Kirker et al. on Nov. 15, 2001.

TECHNICAL FIELD OF THE INVENTION

This disclosure relates in general to the field of centrifugal separators, and more particularly to a system and method for vibration in a centrifuge.

BACKGROUND OF THE INVENTION

The demand for efficient removal of contaminants from water supplies has increased. Because of their relatively small size, many light density contaminants (e.g., microorganisms) may often not be removed by conventional processing methods including fluid separation.

Fluid separation may include any process that captures and removes materials from a liquid stream, typically resulting in a clarified liquid having reduced contaminants and a denser stream containing removed contaminants. Further treating the denser stream in a thickening process may remove additional liquid to leave a thick, pump-able slurry mixture containing nine percent to approximately twelve percent solids by weight. Under certain conditions, a de-watering process may remove more water from the slurry mixture. The de-watering process may create a stackable but still moist mixture of approximately twelve to thirty percent solids by weight. In an extreme de-watering process, the resulting mixture may have up to forty percent solids by weight. In treating a clarified liquid, an associated clarifying process may remove suspended solid particles leaving a substantially further clarified fluid.

One example of a fluid separation technique may include a membrane filtration process. Typically, a membrane filtration process removes particles from a liquid by retaining the particles in a filter of a specific size suited for a particular application. Some examples of membrane filtration processes include microfiltration, ultrafiltration, and nanofiltration. For insoluble particles, microfiltration can be used to retain and remove these particles from a liquid. Ultrafiltration may define a purification process that serves as a primary purification filter to isolate a desired solid product of a specific size. Nanofiltration may remove contaminants as small as microscopic bacterial cyst in a final purification process.

Another example of a fluid separation technique may include centrifugal separation. A centrifuge may use centrifugal force to separate contaminants from a fluid medium by producing a denser stream containing removed contaminates and a clarified fluid stream with less contaminates. Typically, the centrifugal force is several times greater than gravity, which causes more dense contaminants to separate from the fluid medium. During separation, the fluid medium is often placed within a chamber that rotates along a symmetrical axis creating the centrifugal force in a radial direction away from the symmetrical axis. More dense contaminants suspended in the fluid medium are forced against an outer wall of the rotating chamber and may pass through openings in the chamber to an outer catchment basin. The resulting clarified fluid, which is less dense, remains near the axis of rotation and may typically be removed from the chamber via a clarified fluid outlet.

The centrifugal force that drives more dense contaminants to contact the outer walls may create a frictional force between the outer walls and the contaminants. Such frictional forces vary depending on the shape of the outer walls and, in some instances, may impede movement of contaminants towards the openings in the outer wall. As a result, some of the contaminants may remain trapped against the outer walls of the chamber without being removed from the fluid medium. Problems may also occur if the shape of the outer walls allows the fluid medium to pass out of the associated openings before contaminants are separated from the fluid.

SUMMARY OF THE INVENTION

In accordance with teachings of the present invention, disadvantages and problems associated with a centrifuge have been substantially reduced or eliminated. In one embodiment, a centrifuge for separating more dense material from a fluid medium includes a fluid separation wall placed within a non-rotating sleeve. The fluid separation wall may rotate around a generally symmetrical axis of rotation and may include an inner surface and an outer surface with at least one receptacle formed on the inner surface of the fluid separation wall. The receptacle may aid in separation of more dense material from the fluid medium by forming a void space between the inner and outer surface. An excitation apparatus may be associated with the receptacle to create vibration within the receptacle. A flow path may extend through the wall from the void area to an outer surface of the wall to transport more dense material to a containment zone.

In another embodiment of the present invention, a fluid separation wall for separating more dense material from a fluid medium in a centrifuge may include an outer shell operable to receive a plurality of replaceable receptacles. The plurality of replaceable receptacles may aid in separation of more dense material from a fluid medium. Each replaceable receptacle may have an inner surface, a middle section, and an outer surface. A respective geometry may be formed on the inner surface for each receptacle. A receptacle shape may be formed in the middle section of the receptacle such that the receptacle shape interacts with the fluid medium. The inner surface of one or more replaceable receptacles may be in communication with the fluid medium. The outer surface of one or more replaceable receptacles may couple to the outer shell. A vibratory device may be associated with the replaceable receptacle.

In a further embodiment of the present invention, a method of removing more dense material from a fluid medium may include forming a centrifuge core with at least one receptacle having an opening and a flow path extending therethrough. The method may include forming a centrifuge with the centrifuge core disposed within an outer non-rotating collecting sleeve. The method may further include rotating the centrifuge core around an axis of rotation to create centrifugal forces to separate more dense material from a fluid medium by directing more dense material through one or more openings into a void area formed by the receptacle and through a flow path to a collection zone between the centrifuge core and a non-rotating sleeve. The method may include creating an excitation force within the centrifuge such that the excitation force imparts vibration to more dense material.

One technical advantage of the present invention may include reducing friction effect of a receptacle wall with respect to movement of more dense material along the wall. Vibration in the receptacle may create a "slippery" wall effect thus reducing effective frictional forces imparted on more dense material against the walls. This "slippery" wall effect may cause more dense material to proceed along the wall to an associated opening for separation from a fluid medium.

Another technical advantage of the present invention includes preventing or reducing compacting of more dense material in a receptacle during increased de-watering. Vibration may cause more dense material to collect in the receptacle and move through an associated opening. A build up of such more dense material may clog the opening further compacting more dense material, which removes more clarified fluid. Vibrations may then cause the particle to breakup at a desired operating condition thus removing the de-watered more dense material from the receptacle.

A further technical advantage of the present invention may include varying the velocity of separation of more dense material in a fluid medium. Steep or shallow walls on an interior of a receptacle wall may create frictional forces as more dense material moves towards an associated opening. The frictional forces may vary depending upon the angle or slope of the receptacle walls. By increasing the angle or slope, such as adding a steep wall, more dense material may move more rapidly toward the associated opening. This may decrease desired separation caused by centrifugal force since less dense fluid may be carried out an associated opening along with more dense material. Providing a shallow sloped wall one or more interior surfaces of a receptacle allows frictional forces to slow the movement of more dense material, which permits additional removal of liquids such as water from more dense material as it moves more slowly along the walls of the receptacle towards the associated opening. Vibrational forces may be incorporated with these sloped walls to further aid in separation of more dense material from the fluid medium.

All, some or none of these technical advantages may be present in various embodiments of the present invention. Other technical advantages will be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION

Preferred embodiments of the present invention and their advantages are best understood by reference to FIGS. 1 through 11D where like numbers are used to indicate like and corresponding parts.

Figure 1:
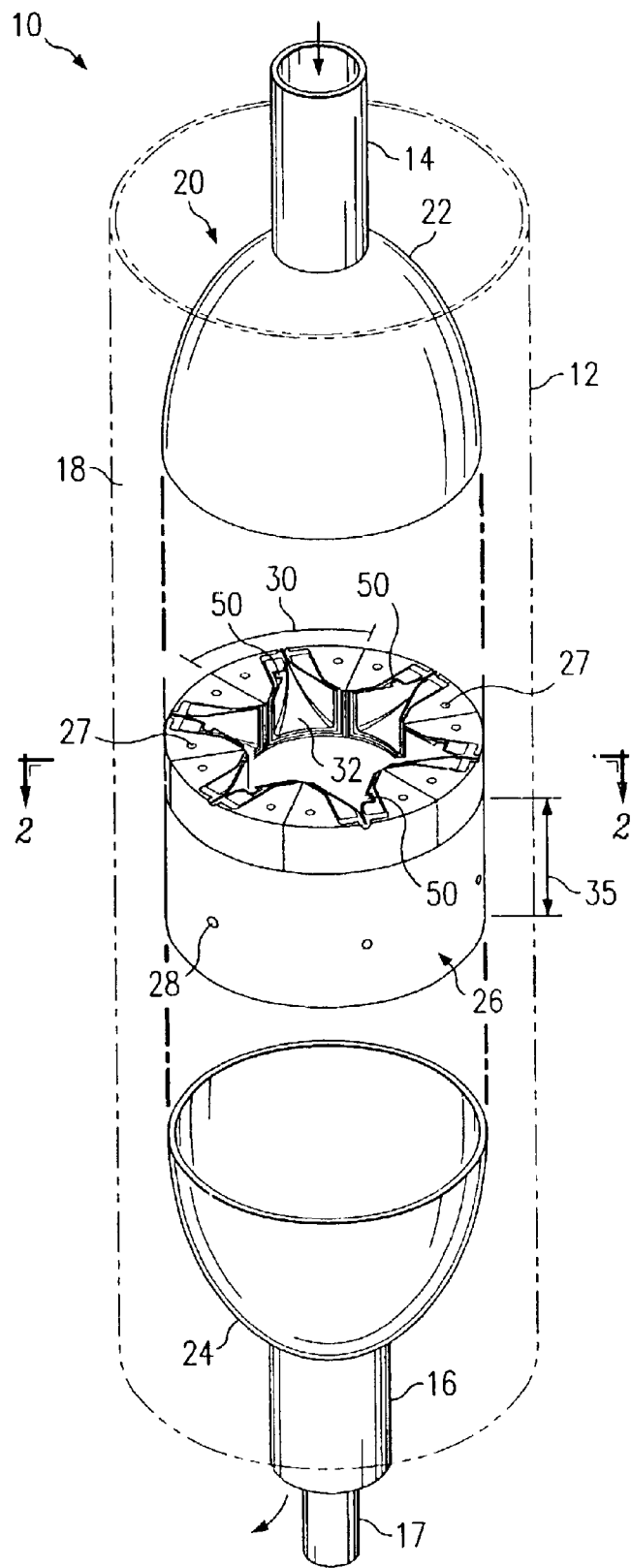
FIG. 1 illustrates a schematic drawing showing an isometric view with portions broken away of a centrifuge incorporating teachings of the present invention.

FIG. 1 illustrates a schematic drawing showing an isometric view with portions broken away of centrifuge 10. Centrifuge 10 may include centrifugal core 20 disposed within non-rotating outer sleeve 12. Centrifugal core 20 may include fluid medium inlet 14, clarified fluid outlet 16, and fluid separation wall 26. Fluid separation wall 26 may be encapsulated between first housing cover 22 and second housing cover 24.

Non-rotating outer sleeve 12 may form accumulation area or containment zone 18 between centrifugal core 20 and non-rotating outer sleeve 12. Accumulation area 18 may collect more dense material and other contaminants that have been separated from the fluid medium and have passed through openings 28. More dense material and other contaminants that have collected within accumulation area 18 may flow between centrifugal core 20 and non-rotating outer sleeve 12 away from centrifuge 10.

Fluid medium inlet 14 may be attached to upper housing cover 22 to provide an opening into centrifuge 10 for the fluid medium. Although fluid medium inlet 14 is shown attached to first housing cover 22, fluid medium inlet 14 may be positioned at any location on centrifugal core 20.

Clarified fluid outlet 16 may be formed in second housing cover 24. Clarified fluid outlet 16 may be used for removal of the clarified fluid after more dense material is removed through openings 28 in fluid separation wall 26.

Figure 2:
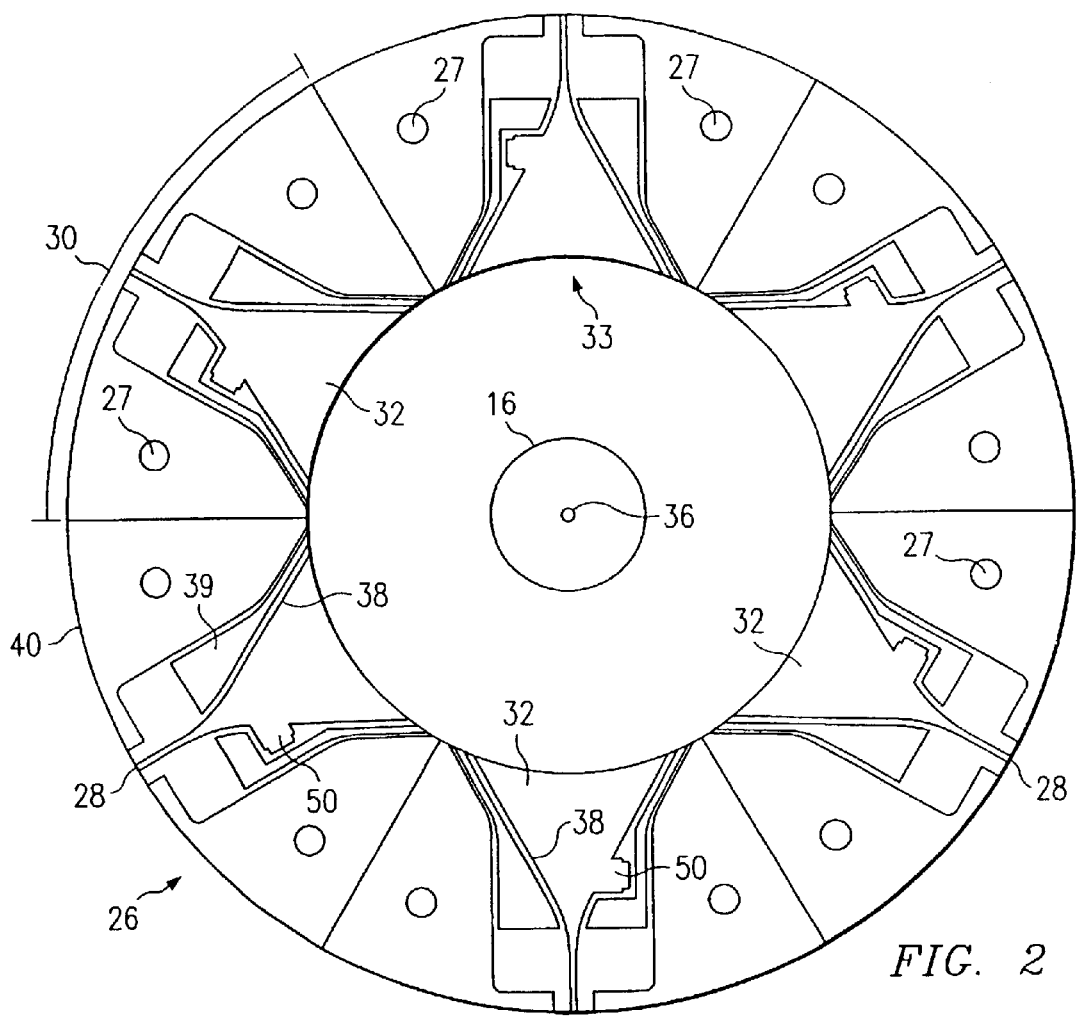
FIG. 2 illustrates a cross-sectional view of the fluid separation wall in section taken along lines 2—2 of FIG. 1.

Fluid separation wall 26 may be disposed between first housing cover 22 and second housing cover 24. First housing cover 22 and second housing cover 24 may be used to form the end pieces of centrifugal core 20 with fluid separation wall 26 disposed therebetween. Fluid separation wall 26 may be formed from various sections and include various receptacles 30, including replaceable receptacles, with respective geometries and shapes. These various sections may include several horizontal layers of receptacles 30 stacked together to form fluid separation wall 26. Alternatively, fluid separation wall 26 may be formed from several vertical sections of receptacles 30 placed together to form fluid separation wall 26. For some embodiments, first housing cover 22 and second housing cover 24 may be attached with long bolts (not expressly shown) through bolt holes 27, as shown in FIG. 2, to hold together the various sections and components of fluid separation wall 26.

Centrifugal core 20 may be designed to rotate within non-rotating sleeve 12. This rotation may create a centrifugal force to separate more dense material from a fluid medium. In some embodiments, a transmission shaft 17 may rotate centrifugal core 20 to create the centrifugal force. The rotation of transmission shaft 17 may develop a centrifugal force within centrifugal core 20 in the range of approximately five hundred to approximately eight thousand gravities, depending on the velocity and the diameter of centrifugal core 20. In one instance, more dense material as small as approximately 0.5 microns in size may be separated from the fluid medium. In some embodiments, centrifuge 10 imparts a centrifugal force on the fluid medium for removal of particulate matter in the range of approximately three millimeters to approximately 0.5 microns.

As the fluid is affected by the centrifugal force, the varying densities within the fluid medium are separated with the heavier, more dense materials being forced towards non-rotating outer sleeve 12. Separation based on varying densities may permit more dense material to be placed near opening 28. In some instances, opening 28 may be placed at the point furthest from axis of rotation 36 to allow the centrifugal force to reach a maximum force. The materials exiting through openings 28 may be disposed on non-rotating outer sleeve 12. The remaining fluid, or clarified fluid, contained within the innermost part of fluid separation wall 26 may overflow centrifugal core 20 into clarified fluid outlet 16. Depending upon the extraction rate of more dense material, more fluid medium may be placed within centrifugal core 20. Typically, the flow rate of fluid medium into centrifugal core 20 may be in the range of approximately thirty to approximately five hundred gallons per minute. In some embodiments, the flow rate of the fluid medium is approximately sixty to one hundred and twenty-five gallons per minute.

Fluid separation wall 26, encased within first housing cover 22 and second housing cover 24, may include receptacle 30 forming a part of fluid separation wall 26. Receptacle 30 may be formed with a middle section that includes respective geometry 32 and a respective shape 33, as described below, leading to opening 28. Depending on respective geometry 32 and respective shape 33 of receptacle 30, the centrifugal forces within receptacle 30 may alter the separation effects of more dense material from the fluid medium. To aid in separation of more dense material, receptacle 30 may further include an excitation device, such as an electro-mechanical vibration device 50.

FIG. 2 illustrates a cross-sectional view of the fluid separation wall in section taken along lines 2—2 of FIG. 1. Centrifugal core 20 may be formed from inner surface 38, middle layer 39, and outer surface 40 arranged around axis of rotation 36. Centrifugal core 20 may include at least one receptacle 30 having at least one opening 28 and may further include excitation apparatus such as electro-mechanical excitation device 50.

Inner surface 38 contacts a fluid medium and typically includes respective geometry 32 to form a part of receptacle 30. Excitation device 50 may be associated with inner surface 38 to impart vibrations on the fluid medium. Because inner surface 38 may be ablated by the fluid medium during separation of more dense material, inner surface 38 may be formed from replaceable inserts having opening 28. Typically, inner surface 38 is formed from a thin stainless steel, ceramic, plastic, urethane, or any material and/or coating suitable for providing an interior wear-resistant layer. In one embodiment, inner surface 38 is formed from a replaceable urethane liner.

Middle layer 39 may provide support and structure to inner surface 38 and may be formed from compressible materials to allow inner surface 38 to compress and seal against outer shell 40. In some embodiments, middle layer 39 may be formed as a flexible barrier placed between inner surface 38 and outer shell 40 to dampen vibrations before reaching outer shell 40. Preferably, middle layer 39 may include a urethane layer that substantially isolates vibration to inner surface 38, which may be created by excitation device 50. Typically, middle layer 39 may be formed from a urethane, filler material, polymer, or any other suitable materials.

Outer shell 40 may be formed adjacent to non-rotating outer sleeve 12 and may include opening 28. Outer shell 40 may be designed to receive middle layer 39 and inner surface 38 including excitation device 50. Typically, outer surface 40 may include an outer strength layer of wound or braided, carbon or graphite filament with a resin, metal, carbon-filled polymer, glass-filled polymer, high-strength composite plastic, or any other suitable material used to provide a high burst strength.

Opening 28 may provide a path for more dense material, which may contain some fluid medium, to be removed from receptacle 30 into accumulation area 18. Typically, opening 28 may include a nozzle formed in receptacle 30. In other embodiments, opening 28 may be formed in part by a device that attaches to receptacle 30, such as a SonoTek nozzle. Opening 28 may also include any aperture or suitable connection to provide a path for more dense material to travel out of receptacle 30 into accumulation area 18.

Because centrifugal core 20 may be centered on axis of rotation 36, the rotation of centrifugal core 20 may create a centrifugal force with the force being directed away from axis of rotation 36. As the fluid medium enters centrifugal core 20, more dense material within the fluid medium is driven outwards in a radial direction extending from axis of rotation 36 towards receptacle 30. The centrifugal force created by the rotation of centrifuge core 20 may increase as more dense material mores further away from axis of rotation 36. The increasing force may force more dense material out through opening 28 to be disposed in accumulation area 18 formed between non-rotating outer sleeve 12 and centrifugal core 20. Opening 28 may form a part of receptacle 30, allowing for more dense material and some fluid medium to pass through receptacle 30 from inner surface 38 of fluid separation wall 26 to the non-rotating outer sleeve 12.

Figure 3:
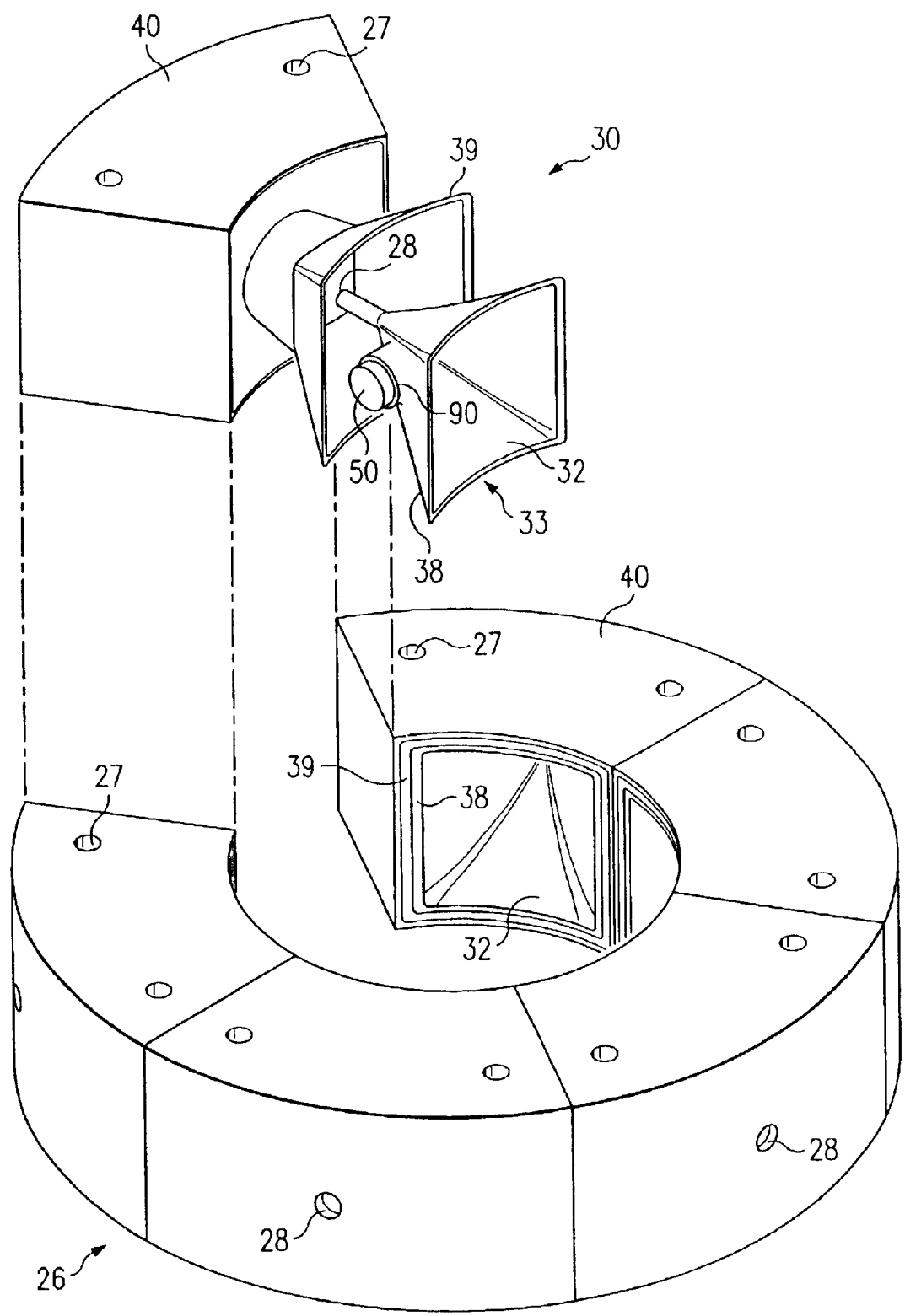
FIG. 3 illustrates an exploded perspective view of a receptacle having an electro-mechanical excitation device forming a part of a fluid separation wall according to an example embodiment of the present invention.

FIG. 3 illustrates an exploded perspective view of receptacle 30 having electro-mechanical excitation device 50 forming a part of fluid separation wall 26. In certain embodiments, electro-mechanical excitation device 50 may associate with one or more receptacle 30 formed in a circular pattern around axis of rotation 36 as shown by looking into clarified fluid entrance 16.

Fluid separation wall 26 may be formed from one or more receptacles 30 arranged symmetrically about axis of rotation 36. Receptacles may be connected either horizontally or vertically to form separation wall 26. Preferably, fluid separation wall 26 includes a plurality of receptacles 30 arranged horizontally to form a generally cylindrical configuration such as a toroidal. Each receptacle 30 in fluid separation wall 26 may include outer shell 40, middle layer 39, inner surface 38, opening 28, and an excitation device such as electro-mechanical excitation device 50 deposited in receptacle 30.

Excitation apparatus may be used to create vibrations within receptacle 30. Excitation apparatus may develop vibrations that vary in frequency and amplitude depending on the fluid medium and the separation process. The frequency of excitation apparatus may range from 100 hertz (Hz) to 40,000 Hz such that the higher frequency causes more vibration cycles per second. The amplitude of vibrations may range from 0.1 milliwatt to 150 kilowatts such that the greater the amplitude power increases the effect of each vibration cycle.

Additionally, the excitation apparatus may be operated in a continuous mode to provide constant vibrations while the centrifuge is operating. Cyclic operation of the apparatus may provide intermittent vibrations to receptacles 30. However, in some embodiments, the excitation apparatus may use condition responsive operations to activate vibrations within receptacle 30, depending on the operating conditions within each receptacle 30 or centrifuge 10. For example, a condition responsive operation may count particulate matter in an extracted fluid stream to activate the excitation apparatus when the particulate count is too low.

In some embodiments, excitation apparatus operates to create a "slippery wall" effect on inner surface 38. The "slippery wall" effect may reduce the frictional effect of the walls on more dense material thus allowing more dense material to proceed to opening 28.

In another embodiment, the excitation apparatus may increase the rate of more dense material entering opening 28. Because large quantities of more dense material may simultaneously enter opening 28, a build up of more dense material may form within opening 28. As the build up of more dense material compacts within opening 28, less dense fluids or materials entrained with more dense material may be "squeezed" or extracted from the fluid medium.

In other embodiments, excitation device 50 may be placed on inner surface 38 near opening 28. Excitation device 50 placed near opening 28 may break up any compactions of more dense material that may form within opening 28 causing more dense material being ejected through opening 28 to containment area 18.

To further aid in separation, receptacle 30 may include respective geometry 32 and respective shape 33. Respective shape 33 of inner surface 38 may aid in separation of more dense material by causing frictional forces to develop between the walls of inner surface 38 and more dense material. Respective shape 33 may vary depending upon the fluid medium and the desired separation properties. For example, respective shape 33 having shallow walls (e.g., walls with very little slope leading to opening 28) may hinder the movement of more dense material to opening 28 due in part to the high friction walls, which may allow for additional de-watering of more dense material.

Excitation device 50 may couple to inner surface 38 to provide a vibration on the wall of inner surface 38 to affect this frictional force. In some embodiments, excitation device 50 may be deposited within the fluid medium.

Respective geometry 32 may be formed on the interior wall of wall of fluid separation wall 26 to aid in the separation of the fluid medium by increasing the available separation area within centrifuge 10. In certain embodiments, receptacle 30 may be formed in combination with several receptacles 30 having corresponding respective geometries and arranged in a honeycomb fashion as permitted by respective shape 33. In another embodiment, receptacle 30 may be arranged to include an area of eighty percent or higher of the total surface of fluid separation wall 26 depending upon respective geometry 32 associated with receptacle 30. Depending upon the application requiring centrifugal separation, fluid separation wall 26 may include combinations of different shaped receptacles 30 formed on inner surface 38. In further embodiments, receptacle 30 may comprise a combination of the different geometries and shapes to form fluid separation wall 26.

Figure 4:
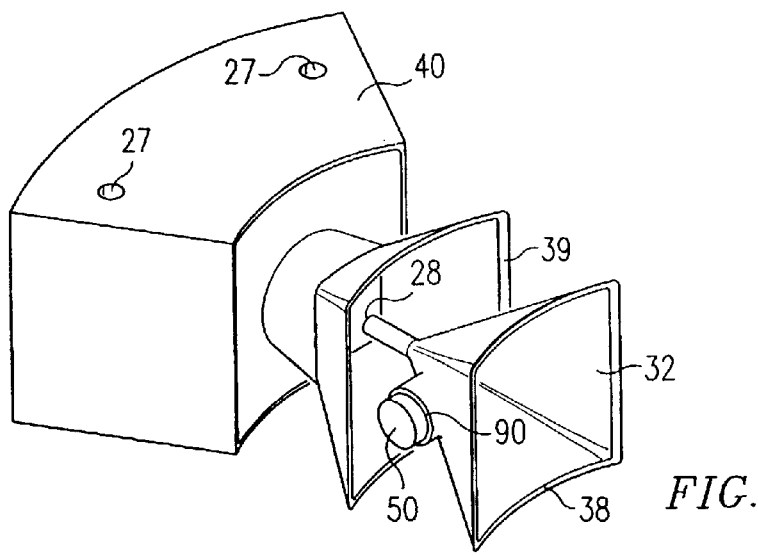
FIG. 4 illustrates an exploded perspective view of a receptacle defined in part by an outer segment, a middle layer, and an inner surface including the electro-mechanical excitation device incorporating teachings of the present invention.

FIG. 4 illustrates an exploded perspective view of receptacle 30 defined in part by outer shell 40, middle layer 39, and inner surface 38 including electro-mechanical excitation device 50. In certain example embodiments, electro-mechanical excitation device 50 may form a part inner surface 38. Location of excitation device 50 on inner surface 38 may be modified depending on respective shape 33, direction of rotation of centrifuge 10, centrifuge application, et cetera. Typically, electro-mechanical excitation device 50 includes a piezo-electric transducer, a magnetic device or any other device able to produce vibrations.

In certain embodiments, inner surface 38 may include mounting surface 90 that may form a part of inner surface 38. Mounting surface 90 may associate electro-mechanical excitation device 50 with inner surface 38. Mounting surface 90 may also be used to orient excitation device 50 for correct installation and/or operation.

Additionally, mounting surface 90 may include electrical attachments such as electrical power, activation switch, or electrical components for adjusting/tuning the vibratory effect. Typically, excitation apparatus is electrical powered including alternating and direct current (e.g., battery power). In other embodiments, excitation device may also be powered by magnetic sources, pneumatic sources, or any other sources operable to generate a vibration.

Excitation device 50 may be activated by various means including automatic and manual controls that may be either human or computer controlled. For example, a pressure sensor (not expressly shown) may indication high pressure within receptacle 30 that may automatically cause computer controls to activate excitation device 50. In one embodiment, a pressure switch placed in the receptacle 30 may activate excitation device 50 as pressure within receptacle 30 increases beyond a set point.

Other activation devices may include computer or other electronic devices able to monitor the operation of separator 10 to activate the excitation device. In some embodiments, each receptacle 30 may activate independently from other receptacles 30. However, in one example embodiment, an electronic device measures the moisture content of the separated more dense material. Any change in the moisture content from a pre-defined set point may activate the vibration devices in all receptacles 30.

Excitation apparatus may create vibrations within receptacle 30 under operating conditions. In some embodiments, vibrations may be continuous during the operations of centrifuge 10. However, under different operating conditions, vibrations may be cycled on and off depending upon the operating conditions. Additionally, vibrations may be applied in a random fashion (e.g., intermittently creating vibrations).

Figure 5:
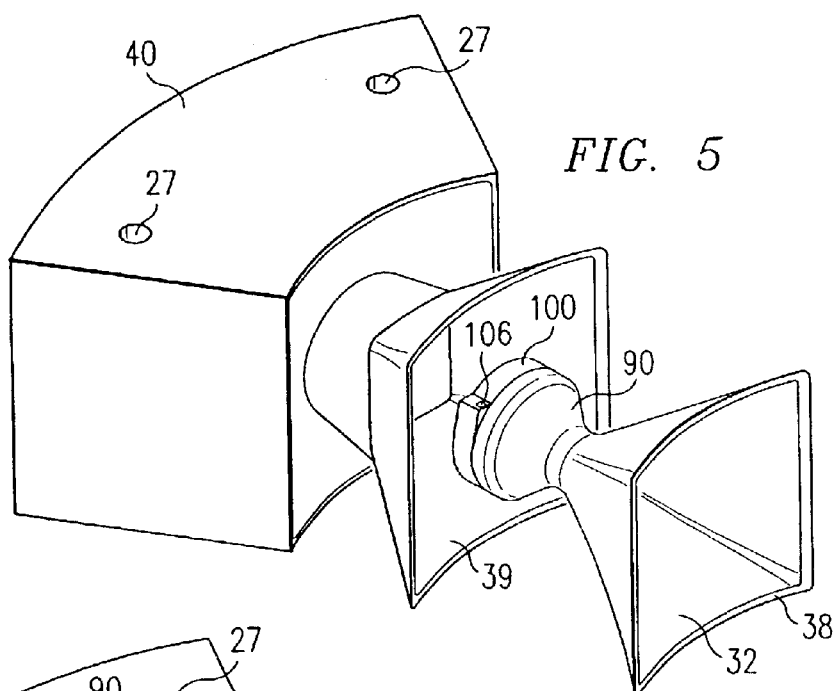
FIG. 5 illustrates an exploded perspective view of an example embodiment of a ball raceway excitation device attached to a receptacle incorporating teachings of the present invention.

FIG. 5 illustrates an exploded perspective view of an example embodiment of ball raceway excitation device 100 attached to receptacle 30. As shown, ball raceway excitation device 100 may be formed near opening 28.

Ball raceway excitation device 100 may be formed from a substantially circular track or raceway that contains an object (e.g., a ball) placed in the track. Vibrations are generated as the object travels around the track due to the forces used to keep the object within the track. Because the forces are applied to at a separate location on the track at any given time, vibrations are generated in a direction radial from the track.

As shown, ball raceway excitation device 100 may rotate in a substantially circular path around opening 28. The circular path may create vibrations in a substantially perpendicular direction to the exiting more dense fluid. In one embodiment, vibrations from ball raceway excitation device 100 may aid in breaking up any build up of more dense material within opening 28. Depending upon the desired separation, vibrations may be created in any direction such as an axial vibration, radial vibration, linear vibration, torsional vibration, arced vibration, or any other vibration direction able to induce a vibration effect in receptacle 30.

Figure 6:
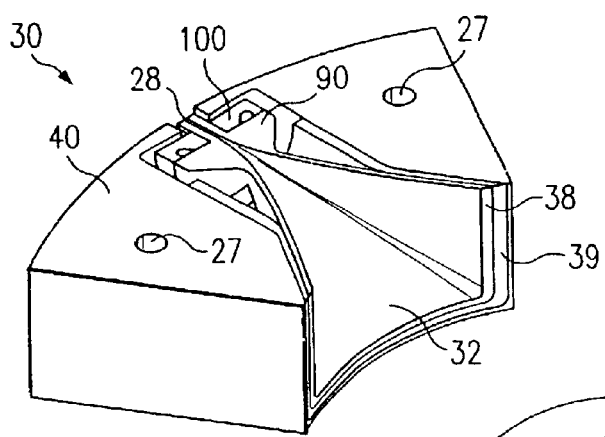
FIG. 6 illustrates a cross-sectional view of the receptacle having the ball raceway excitation device as shown in FIG. 5.

FIG. 6 illustrates a cross-section view of receptacle 30 having ball raceway excitation device 100 as shown in FIG. 5. In certain example embodiments, vibratory device 90 may be mounted on mounting surface 90 such as a flange that is formed as a part of inner surface 38.

Mounting surface 90 may be formed as a part of inner surface 38 to aid in the placement of ball raceway excitation device 100. In some embodiments, mounting surface 90 may be used to provide an orientation direction for installing ball raceway excitation device 100. In other embodiments, mounting surface 90 may provide an attachment for electrical power or vibration sensor for monitoring excitation device 100.

Additionally, mounting surface 90 may be used to direct vibrations to inner surface 38. Because ball raceway excitation device 100 rotates in a substantially circular path around the flow path exiting opening 28, vibrations are typically directed to opening 28 to break up any congestion of more dense materials. In other embodiments, vibrations generated by ball raceway excitation device 100 may be directed to the fluid medium within receptacle 30 to aid in separation of more dense fluid.

Figure 7:
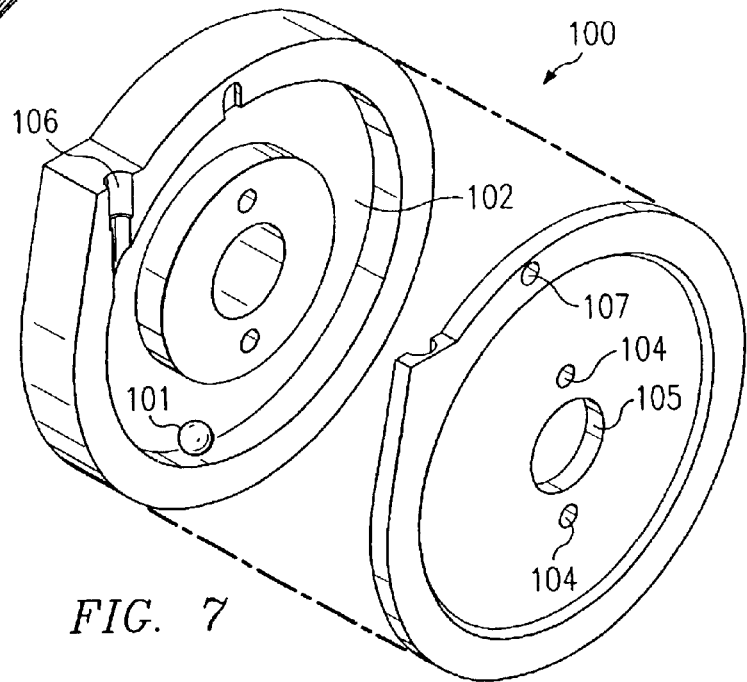
FIG. 7 illustrates a perspective cross-sectional view of the ball raceway excitation device according to the teachings of the present invention.

FIG. 7 illustrates a perspective cross-sectional view of ball raceway excitation device 100. In certain embodiments, ball raceway excitation device 100 may include ball 101 formed in race 102 that rotates in an orbital path perpendicular to opening 28. Air inlet 106 may provide a compressed air or other fluid to drive ball 101 within race 102. Excitation device 100 may include mounting holes 104 to mate with pins (not expressly shown) on mounting surface 90 to prevent excitation device 100 from rotating around opening 28 during operation.

Air or any other driving fluid may enter through air hole 106 to drive ball 101 around race 102. Relief hole 107 allows the air to escape from race 102 creating an air path from air hole 106 to relief hole 107. Pressure from the air flowing through the air path may drive ball 101 around race 102. Although race 102 may be shown in a circular pattern, race 102 also may be in a substantially elliptical or orbital pattern around hole that may be used to set up a vibratory effect around opening 28.

Figure 8:
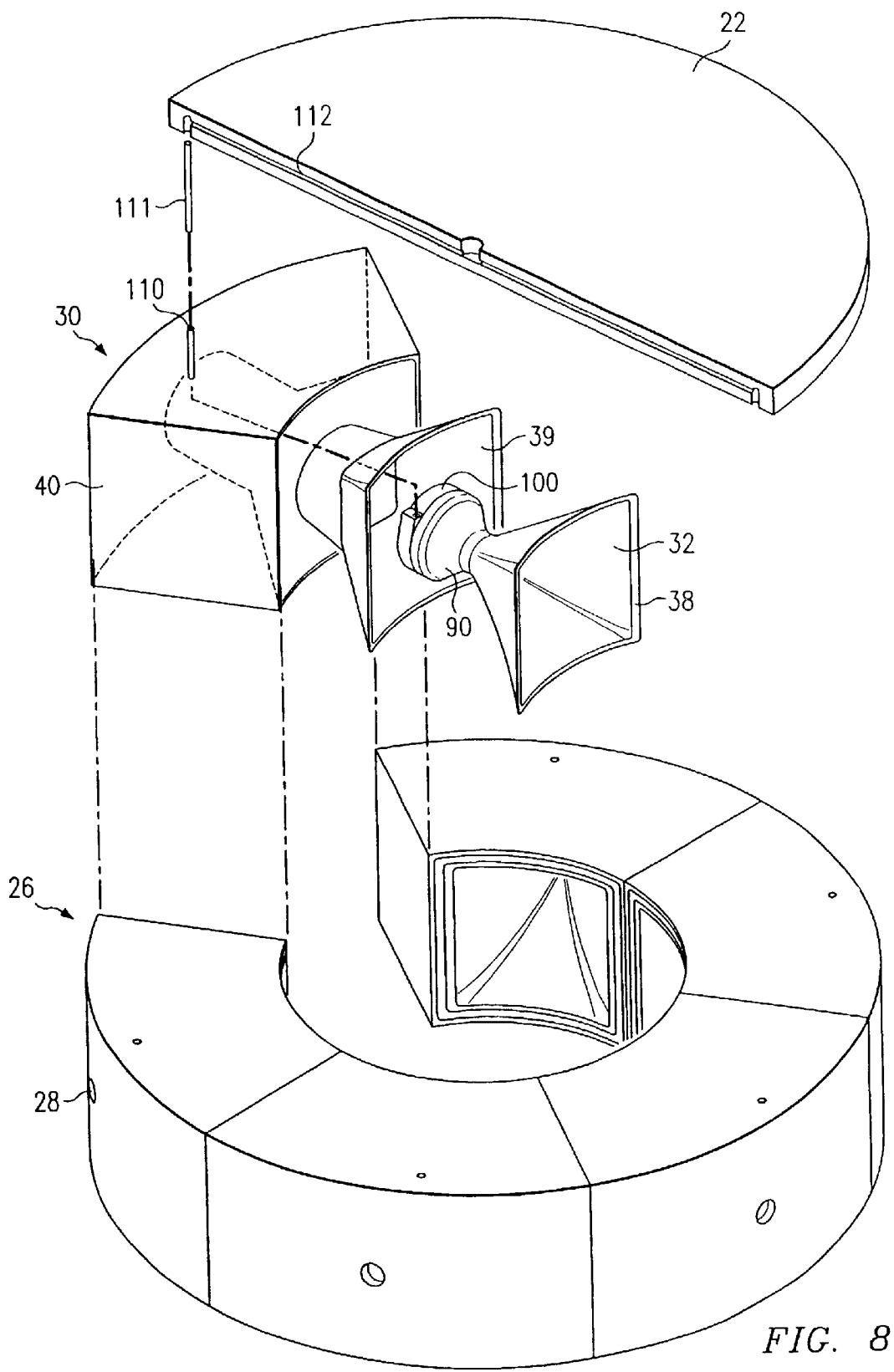
FIG. 8 illustrates a perspective exploded view of a central air system used to activate the ball raceway excitation device according to the teachings of the present invention.

FIG. 8 illustrates a perspective exploded view of central air system 105 used to activate ball raceway excitation device 100. In an example embodiment, central air system 105 supplies air to each receptacle 30 for powering excitation device 100. Central air system 105 may be used to drive multiple excitation devices 100 in centrifuge 10. Central air system 105 may control the vibratory effects by increasing and/or decreasing the operating pressure of the air.

As shown, central air system 105 may supply air or any other fluid medium through distribution line 112. Distribution line 112 may attach with rotating line connection 113 to receive air from an outside source. Air enters rotating line connection 113 and may be separated into several distribution lines 112 to supply air to a single receptacle or a group of receptacles.

In one example embodiment, distribution line 112 connects with feed line 111. Feed line 111 may connect directly with air opening 106 of excitation device 100 through receptacle air opening 110. In another example embodiment, air feed line 111 may extend to another receptacle positioned adjacent to this receptacle.

Figure 9A:
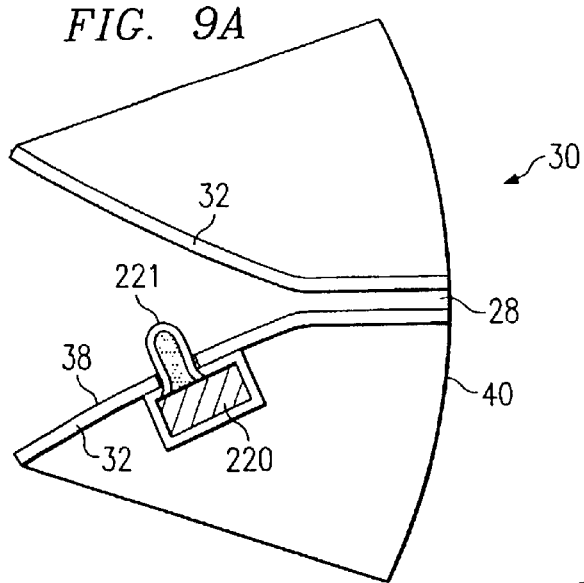
FIGS. 9A–9C illustrate other example embodiments of excitation devices placed at various locations in the receptacle according to the teachings of the present invention.
Figure 9B:
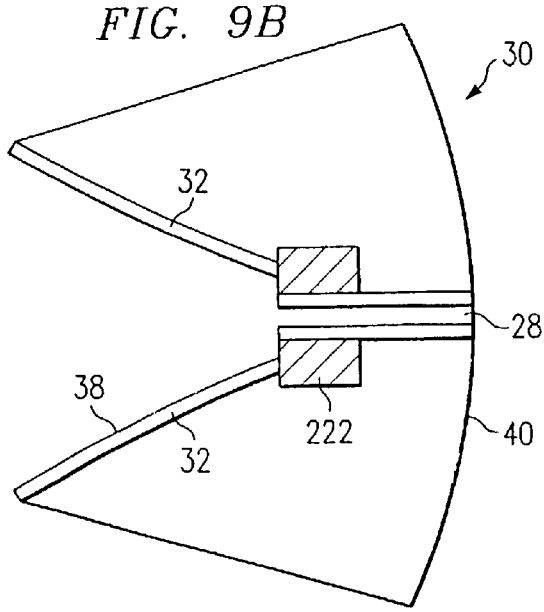
Figure 9C:
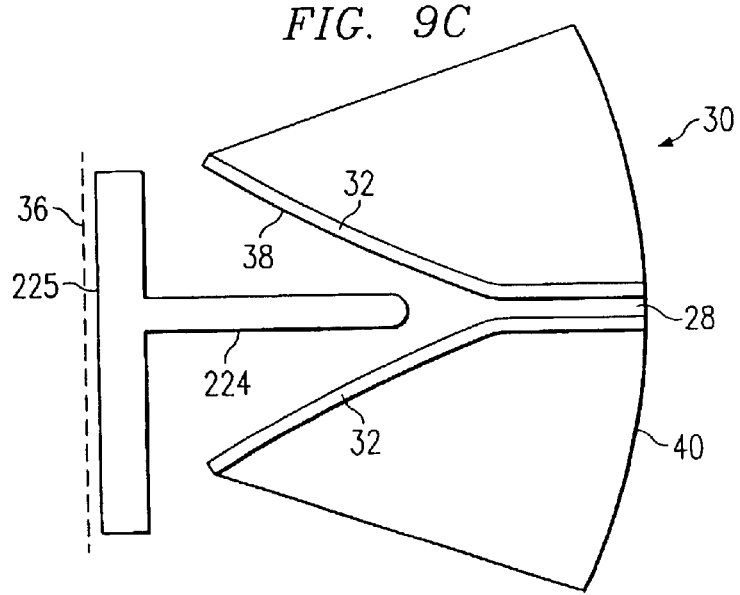

FIGS. 9A through 9C illustrate other example embodiments of excitation devices placed at various locations in receptacle 30. Referring to FIG. 9A, wall/fluid excitation device 220 may be formed on inner surface 38 of receptacle 30. In one embodiment, wall/fluid excitation device 220 extends into the fluid medium and may, in some instances, contact the fluid medium with projection 221. Wall/Fluid excitation device 220 may create a vibration effect not only within the fluid but also along inner surface 38. Projection 221 may further be operable to create a disruption within receptacle 30. The disruption may be used to prevent clogging of opening 28.

Referring to FIG. 9B, nozzle excitation device 222 may be formed around opening 28. Nozzle excitation device 222 may be formed to remove the congestion of more dense fluid that has compacted in opening 28. In one example embodiment, nozzle excitation device 222 includes a Sono-Tek nozzle such as a Sono-Tek ultrasonic nozzle. In this instance, nozzle excitation device 222 may form a part of both opening 28 and excitation apparatus.

Referring to FIG. 9C, extension excitation device 224 may extend from centrifugal core 225 into receptacle 30. In some embodiments, extension excitation device 224 causes a vibratory effect in the fluid medium. The vibratory effects may be transmitted through the medium to inner surface 38 of receptacle 30. In certain embodiments, extension excitation device 224 creates a slippery effect on inner surface 38 causing more dense material to move to opening 28.

FIGS. 10A–10D illustrate various opening respective geometries 32 for receptacle 30 for use with various excitation devices. Depending on a particular separation application, receptacle 30 may include a variety of respective geometries 32 formed on the opening of inner surface 38. Typically, receptacles 30 are arranged in a honeycomb fashion along inner surface 38 of fluid separation wall 26 to separate more dense material from the fluid medium.

Figure 10A:
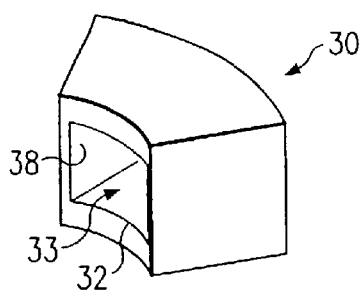
FIGS. 10A–10D illustrate various opening geometries for a receptacle for use with various excitation devices according to the present invention.
Figure 10B:
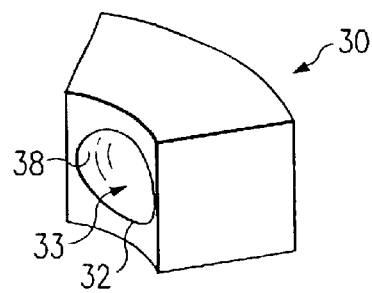
Figure 10C:
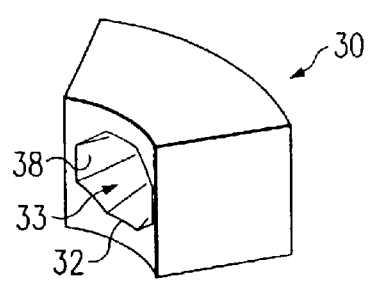
Figure 10D:
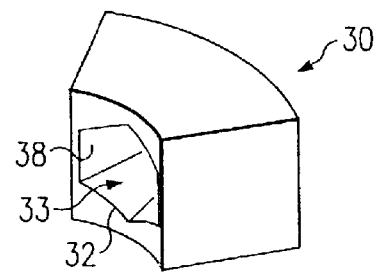

Depending upon the application of the fluid separation, respective geometry 32 selected may include four-sided receptacle, as shown in FIG. 10A, circular receptacle, as shown in FIG. 10B, a hexagonal receptacle, as shown in FIG. 10C, or any multi-sided receptacle, such as a pentagonal receptacle, as shown in FIG. 10D. Other respective geometries 32 of receptacle 30 formed on inner surface 38 may include a triangle, a square, a rectangular, a trapezoid, a diamond, a rhombus, a pentagon, a hexagon, an octagon, a circle, an oval, a multi-sided figure, or any other geometry suitable to form receptacle 30 on inner surface 38.

In some embodiments, receptacle 30 may include respective geometry 32 formed on the interior wall of fluid separation wall 26 having converging sloped walls leading from the interior surface of fluid separation wall 26 to a center opening 28 in the exterior portion of fluid separation wall 26. In certain embodiments, receptacle 30 may be formed with several receptacles 30 arranged in a honeycomb fashion. In another embodiment, receptacle 30 may be arranged to have an area of eighty percent or higher of the total surface of fluid separation wall 26. Depending upon the application requiring centrifugal separation, fluid separation wall 26 may include combinations of different shaped receptacles 30 formed on inner surface 38. In further embodiments, receptacle 30 may include a combination of different geometries and shapes to form fluid separation wall 26.

In addition to forming respective geometry 32, receptacle 30 may include a variety of respective shapes 33. Respective shape 33 of receptacle 30 formed in middle layer 39 may include a pyramidal, a triangular, a pentagonal, hexagonal, octagonal, trapezoidal, or any other multi-walled shape operable to provide a void area within fluid separation wall 26. Respective shapes 33 of receptacle 30 may further be defined to include curved walls, compound curved walls, steep sloped walls, shallow sloped walls, straight walls, flat walls, asymmetric shaped walls, irregular shaped walls, any combination thereof, or any other wall shape suitable to form receptacle 30 within middle layer 39.

Figure 11A:
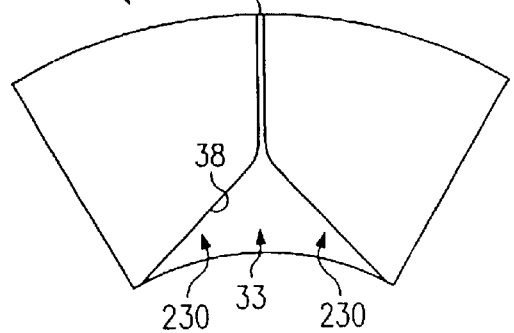
FIGS. 11A–11D illustrate cross-sectional views of example embodiments of respective shapes formed on an inner surface of a receptacle for use with the excitation device according to the teachings of the present invention.
Figure 11B:
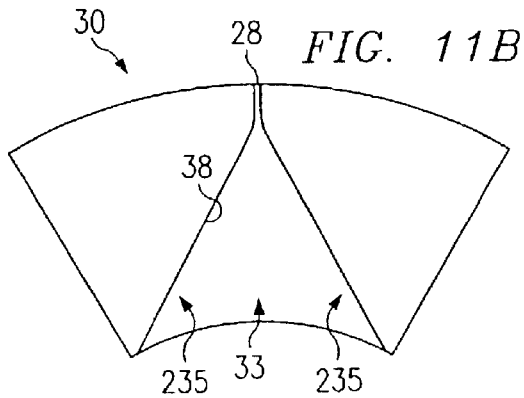
Figure 11C:
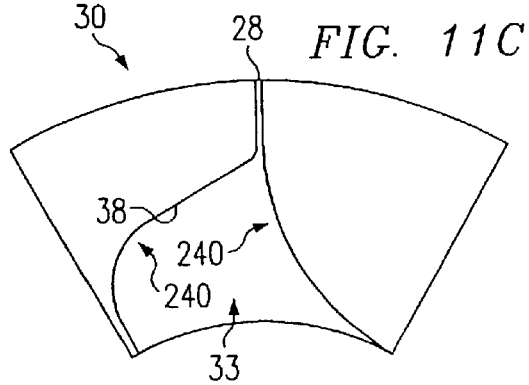

FIGS. 11A–11D illustrate cross-sectional views of example embodiments of respective shapes 33 formed on inner surface 38 of receptacle 30 for use with the excitation device. Referring to FIGS. 11A and 11B, receptacle 30 may include straight sidewalls having shallow sloped sidewall 230 or steep sloped sidewall 235. Typically, straight sidewalls include various degrees of slopes on the inner surface 38 of receptacle 30. The angles of the slope may include any slope from approximately one-degree to approximately ninety degrees. Preferably, slope of sidewall includes angles measuring between twenty degrees and sixty degrees. Straight slope sidewalls allow for a uniform force to be generated along the walls that varies with the distance from axis of rotation. Thus, the increasing centrifugal force on more dense material allows separation at a uniform rate as more dense material accelerates towards opening 28.

By increasing the angle of slope to create steep sloped sidewall 235, more dense material may move more rapidly with the centrifugal force towards opening 28. In contrast, decreasing the angle of slope on receptacle 30 may increase frictional forces between more dense material on shallow sloped sidewall 230 as more dense material moves towards opening 28. The increasing frictional force may be intensified by the increase in centrifugal force as more dense material moves farther away from axis of rotation 36.

Referring to FIG. 1C, receptacle 30 may include curved sidewall 240. Curved sidewall 240 may be formed in part by walls of varying degrees of angles. In some embodiments, curved sidewall 240 may include a first wall substantially perpendicular to the flow path of more dense material and a second wall having varying degrees of angles leading to opening 28.

Second wall of curved sidewall 240 may have a steep slope near the entrance of receptacle 30 that imparts minimal frictional force on more dense material. However, as more dense material moves towards opening 28, the slope of the second wall may become shallower such that the wall imparts increasing frictional forces on more dense material. Slope of the second wall may be extremely shallow near opening 28 to reduce the velocity of more dense material thus permitting additional time for more de-watering of more dense material prior to expelling the material through opening 28 into accumulation area 18.

De-watering not only includes the process of removing water from a fluid medium but also may include any process for removing a first fluid medium from a second fluid medium.

Figure 11D:
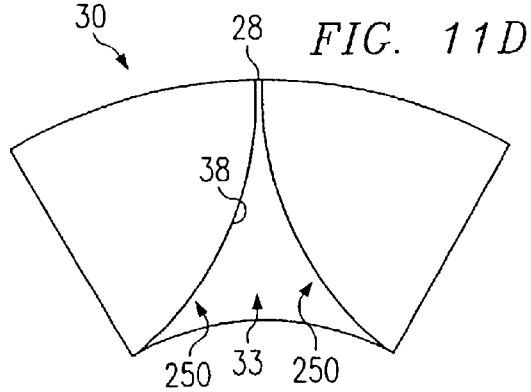

Referring to FIG. 11D, receptacle 30 may include fluted curved sidewall 250. Fluted curved sidewall 250 may include varying angles from entrance of receptacle 30 to opening 28. In certain embodiments, compound curve sidewall 250 may include an angle of slope. The angle of slope may vary from the entrance of receptacle 30 leading down to opening 28. The varying degrees of the slope may include a range of approximately ninety degrees formed near opening 28 to an angle of approximately thirty-seven degrees near the entrance of receptacle 30. These varying degrees along the wall may create a frictional force that is greater at entrance of receptacle 30 than near opening 28.

Depending on angle of the slope forming fluted curved sidewall 250, more dense material within the fluid medium may encounter high frictional wall forces at the entrance of receptacle 30 resulting in increased time for separation of more dense material from the fluid medium. As more dense material moves along the wall of receptacle 30 towards opening 28, the angle of the wall may decrease resulting in less wall friction. With less wall friction, the fluid medium moves more quickly along the wall towards opening 28 decreasing the amount of time for separation of more dense material from the fluid medium. However, as the friction is reducing due to the slope of the walls increasing, the centrifugal force may increase as the distance from axis of rotation 36 increases. Thus, the separation of more dense material from the fluid medium may depend on the centrifugal force and rate of separation within receptacle 30.

As more dense material enters opening 28 of receptacle 30, the frictional force may be insignificant compared to the centrifugal force causing more dense material to become densely packed at the exit of opening 28. This compaction of more dense material near the exit of opening 28 may provide additional clarification of the fluid medium due to the compaction being under high pressure. Because the extracted clarified fluid is less dense, the fluid may be forced towards center of centrifugal core 20 near the axis of rotation 36. However, more dense material may be expelled through opening 28 to be deposited in accumulation area 18.

Figure 12:
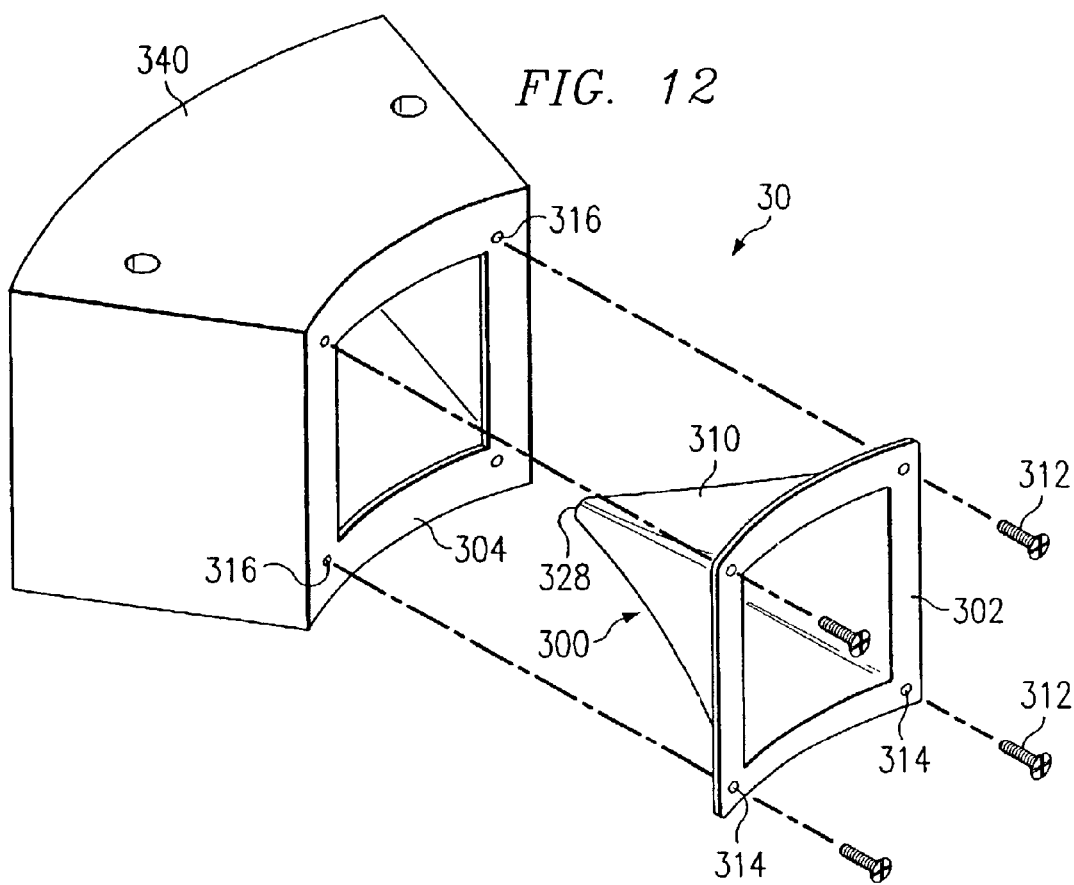
FIG. 12 illustrates a perspective exploded view of the receptacle defined in part by an inner shell and an outer shell segment according to the teachings of the present invention.

FIG. 12 illustrates a perspective exploded view of receptacle 30 defined in part by inner shell 300 and outer shell segment 340. Receptacle 30 may also include a replaceable receptacle such that a plurality of replaceable receptacles may form fluid separation wall 26. Typically, receptacle 30 includes excitation device 50 or any other device operable to create an excitation force within receptacle 30.

Inner shell 300 may form a portion of receptacle 30 such that inner shell 300 contacts the fluid medium. In some embodiments, inner shell 300 includes flanged surface 302, shell wall 310 and shell opening 328. Inner shell 300 may include respective geometry 32 formed in shell wall 310 and respective shape 33 to aid in the separation of more dense material from the fluid medium. Typically, inner shell 300 may be formed from flexible spring steel (e.g., thin stainless steel), flexible diaphragm, or any other material suitable to vibrate.

In some embodiments, flanged surface 302 provides support for inner shell 300 such that shell wall 310 and shell opening 328 are "free floating" within outer shell segment 340. Since shell wall 310 and shell opening 328 may be suspended without contacting outer shell segment 340, any excitation force applied to inner shell 300 may cause shell wall 310 and shell opening 328 to vibrate.

Outer shell segment 340 may be formed adjacent to outer sleeve 12 and be operable to receive inner shell 300. Typically, outer shell segment 340 includes mounting surface 304 that provides an attachment location for inner shell 300. In some embodiments, outer shell segment 340 includes mounting surface 304 that may be formed to receive and support inner shell 300.

Figure 13:
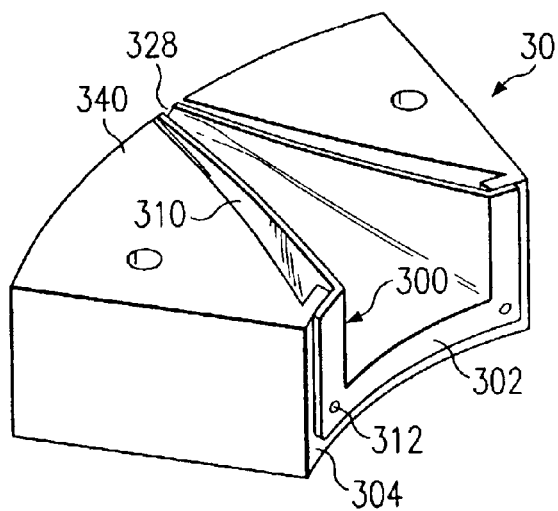
FIG. 13 illustrates a cross-sectional view of the receptacle including the inner shell attached to the outer shell segment as shown in FIG. 12.

FIG. 13 illustrates a cross-sectional view of receptacle 30 including inner shell 300 attached to outer shell segment 340 as shown in FIG. 12. Inner shell 300 may include flanged surface 302 designed to attach to mounting surface 304 formed on a portion of outer shell segment 340. Typically, flange surface 302 may be coupled to mounting surface 304 by mechanical means such as welding, soldering, screwing, or any suitable type of mechanical fasteners. For example, screw 312 may be inserted through screw opening 314 to connect with screw hole 316 to couple inner shell 300 to outer shell segment 340. Additionally, flanged surface 302 and mounting surface 304 may be attached with chemical means including adhesives or any other suitable type of means for attaching flange surface 302 to mounting surface 304.

Although inner shell 300 is illustrated with flange surface 304 having a large surface area for contacting outer shell segment 340, inner shell 300 may couple to outer shell segment 340 with any means to allow shell wall 310 and shell opening 328 to be supported within outer shell segment 340.

What is claimed is:

1. A centrifuge for removing more dense material from a fluid medium, comprising:
   a fluid separation wall placed within a non-rotating sleeve to form a containment zone therebetween;
   the containment zone operable to receive a portion of the fluid medium having a greater concentration of the more dense material;
   the fluid separation wall aligned generally parallel to an axis of rotation and operable to rotate around the axis of rotation, the fluid separation wall having an inner surface and an outer surface;
   at least one receptacle formed on the inner surface of the fluid separation wall;
   the receptacle operable to aid in separation of the more dense material from the fluid medium by forming a void space between the inner surface and the outer surface;
   an excitation apparatus associated with the receptacle, the excitation apparatus operable to create a vibration within the receptacle;
   at least one flow path extending through the fluid separation wall from the void area to the outer surface of the receptacle; and
   the flow path operable to transport the more dense material to the containment zone.

2. The centrifuge of claim 1, further comprising:
   the fluid separation wall having a middle section formed between the inner surface and the outer surface;
   a respective geometry formed on the inner surface for each receptacle;
   a receptacle shape formed in the middle section of the receptacle; and
   the receptacle shape in communication with the fluid medium.

3. The centrifuge of claim 2, wherein each receptacle further comprises a respective geometry selected from the group consisting of a triangle, a square, a rectangle, a trapezoid, a diamond, a rhombus, a pentagon, a hexagon, an octagon, a circle, an oval, and a multi-sided figure.

4. The centrifuge of claim 2, wherein each receptacle further comprises a respective shape selected from the group consisting of pyramidal, triangular, pentagonal, hexagonal, octagonal, trapezoidal, and multi-walled shape.

5. The centrifuge of claim 4, wherein the respective shape further comprises a wall selected from the group consisting of a curved wall, a compound curved wall, a steep sloped wall, a shallow sloped wall, a straight wall, a flat wall, an asymmetric shaped wall, an irregular shaped wall, and any combination thereof.

6. The centrifuge of claim 1, further comprising an activation switch operable to activate the excitation device causing the vibration.

7. The centrifuge of claim 1, further comprising a flexible middle layer disposed between the inner surface and the outer surface, the flexible middle layer operable to dampen the vibration from the excitation device.

8. The centrifuge of claim 1, wherein the excitation apparatus comprises an electro-mechanical vibration inducing device.

9. The centrifuge of claim 1, wherein the excitation apparatus comprises an object operable to rotate in a substantially circular pattern to create the vibration.

10. The centrifuge of claim 1, the excitation apparatus comprising:
    a projection extending from a center core disposed in the centrifuge; and
    the projection operable to extend into the fluid medium placed in the receptacle to impart a vibration into the fluid medium.

11. The centrifuge of claim 1, wherein the excitation device and the opening are formed in part by a vibration inducing nozzle.

12. The centrifuge of claim 1, wherein the vibration comprises a frequency of 100 hertz (Hz) to 40,000 Hz.

13. The centrifuge of claim 1, wherein the vibration comprises an amplitude of 0.1 milliwatts to 150 kilowatts.

14. A fluid separation wall separating more dense material from a fluid medium in a centrifuge, comprising:
    an outer shell operable to receive a plurality of replaceable receptacles;
    the plurality of replaceable receptacles to aid in the separation of more dense material from a fluid medium;
    each replaceable receptacle having an inner surface, a middle section, and an outer surface;
    a respective geometry formed on the inner surface for each replaceable receptacle;
    a receptacle shape formed in the middle section of each replaceable receptacle, the receptacle shape operable to interact with the fluid medium;
    the inner surface of each replaceable receptacle operable to be in communication with the fluid medium;

the outer surface of each replaceable receptacle operable to couple to the outer shell; and a vibratory device associated with each replaceable receptacle.

15. The fluid separation wall of claim 14, further comprising the vibratory device operable to reduce the frictional effect of the inner surface on the fluid medium such that the more dense material separates from the fluid medium causing the more dense material to compact in the receptacle.

16. The fluid separation wall of claim 14, further comprising the vibratory device operable to disassociate a build up of more dense material formed in the receptacle.

17. The centrifuge of claim 14, wherein each receptacle further comprises a respective geometry selected from the group consisting of a triangle, a square, a rectangle, a trapezoid, a diamond, a rhombus, a pentagon, a hexagon, an octagon, a circle, an oval, and a multi-sided figure.

18. The centrifuge of claim 14, wherein each receptacle further comprises a respective shape selected from the group consisting of pyramidal, triangular, pentagonal, hexagonal, octagonal, trapezoidal, and multi-walled shape.

19. The centrifuge of claim 18, wherein the respective shape further comprises a wall selected from the group consisting of a curved wall, a compound curved wall, a steep sloped wall, a shallow sloped wall, a straight wall, a flat wall, an asymmetric shaped wall, an irregular shaped wall, and any combination thereof.

20. The fluid separation wall of claim 14, further comprising a flexible layer disposed between the receptacle and the outer shell.

21. The fluid separation wall of claim 20, wherein the flexible layer comprises a compressible urethane material.

22. The fluid separation wall of claim 14, wherein the vibration device comprises a ball traveling in a substantially circular track formed substantially concentric to a flow path of the more dense material to impart a vibration substantially perpendicular to the flow path.

23. The fluid separation wall of claim 22, further comprising an air inlet channel operable to power the circular object.

24. The fluid separation wall of claim 14, further comprising an air inlet for powering the vibratory device.

25. The fluid separation wall of claim 14, further comprising:

the vibratory device operable to create a vibration in at least one vibration direction; and the vibration direction selected from the group consisting of axial vibration, radial vibration, linear vibration, torsional vibration, and arced vibration.

26. A centrifuge for removing more dense material from a fluid medium, comprising:

a fluid separation wall placed within a non-rotating sleeve to form a containment zone therebetween;

the containment zone operable to receive a portion of the fluid medium having a greater concentration of the more dense material;

the fluid separation wall aligned generally parallel to an axis of rotation and operable to rotate around the axis of rotation, the fluid separation wall having an inner surface, middle section, and an outer surface;

at least one receptacle formed on the inner surface of the fluid separation wall;

a respective geometry formed on the inner surface for each receptacle;

a receptacle shape formed in the middle section of the receptacle, the receptacle shape in communication with the fluid medium;

the receptacle operable to aid in separation of the more dense material from the fluid medium by forming a void space between the inner surface and the outer surface;

at least one flow path extending through the fluid separation wall from the void area to the outer surface of the receptacle;

flow path operable to transport the more dense material to the containment zone; and means for vibrating the receptacle such that the more dense material moves toward the flow path to the containment zone.

27. A centrifuge for removing more dense material from a fluid medium, comprising:

a fluid separation wall placed within a non-rotating sleeve to form a containment zone therebetween;

the containment zone operable to receive a portion of the fluid medium having a greater concentration of the more dense material;

the fluid separation wall aligned generally parallel to an axis of rotation and operable to rotate around the axis of rotation;

a plurality of replaceable receptacles forming part of the fluid separation wall, the plurality of replaceable receptacles to aid in the separation of more dense material from the fluid medium;

an inner shell forming a part of the replaceable receptacle, the inner shell including a flanged surface and at least one opening, wherein the inner shell is communication with the fluid medium;

an outer shell segment forming a part of the replaceable receptacle and including a mounting surface, the mounting surface operable to couple to the flanged surface of the inner shell;

at least one flow path extending through the fluid separation wall and out the at least one opening of the inner shell to the containment zone, the flow path operable to transport the more dense material to the containment zone; and a plurality of excitation apparatuses associated with the plurality of replaceable receptacles, each of the plurality of excitation apparatuses is associated with a respective replaceable receptacle, operable to create a vibration within the respective replaceable receptacle.

28. The centrifuge of claim 27 further comprising a shell wall forming a part of the inner shell, the shell wall including a receptacle shape operable to interact with the fluid medium.

* * * * *